(12) United States Patent
Klassen et al.

(10) Patent No.: US 12,109,697 B2
(45) Date of Patent: Oct. 8, 2024

(54) ACTUATOR ARRANGEMENT

(71) Applicants: Genesis Motion Solutions, LP, Wichita, KS (US); Genesis Advanced Technology Inc., Surrey (CA)

(72) Inventors: James B. Klassen, Osoyoos (CA); Nathan Armstrong, Rocky View County (CA)

(73) Assignees: Genesis Advanced Technology Inc., Surrey (CA); 1478021 B.C. Ltd, Surrey (CA)

( * ) Notice: Subject to any disclaimer, the term of this patent is extended or adjusted under 35 U.S.C. 154(b) by 344 days.

(21) Appl. No.: 17/418,882

(22) PCT Filed: Jan. 16, 2020

(86) PCT No.: PCT/IB2020/050330
§ 371 (c)(1),
(2) Date: Jun. 28, 2021

(87) PCT Pub. No.: WO2020/148692
PCT Pub. Date: Jul. 23, 2020

(65) Prior Publication Data
US 2022/0055227 A1     Feb. 24, 2022

Related U.S. Application Data

(60) Provisional application No. 62/793,026, filed on Jan. 16, 2019.

(30) Foreign Application Priority Data

Oct. 17, 2019  (GB) ..................... 1915013

(51) Int. Cl.
*B25J 9/10*    (2006.01)
*B25J 9/12*    (2006.01)
(Continued)

(52) U.S. Cl.
CPC ............... *B25J 9/104* (2013.01); *B25J 9/126* (2013.01); *B25J 13/088* (2013.01); *H02K 7/003* (2013.01);
(Continued)

(58) Field of Classification Search
CPC . F16H 19/005; F16H 7/02; B25J 9/126; B25J 9/104
See application file for complete search history.

(56) References Cited

U.S. PATENT DOCUMENTS 2,404,377 A    7/1946  Herbst
3,410,148 A   11/1968  George
(Continued)

FOREIGN PATENT DOCUMENTS

CA    2937988       2/2018
CN    2389255 Y    7/2000
(Continued)

OTHER PUBLICATIONS

Notice of Allowance Received for U.S. Appl. No. 29/766,311, dated Aug. 8, 2022, 08 Pages.
(Continued)

*Primary Examiner* — Thomas C Diaz
(74) *Attorney, Agent, or Firm* — Alston & Bird LLP

(57) ABSTRACT

An actuator comprising: a motor having a housing and a drive shaft, the motor arranged to rotate the drive shaft relative to the housing about a drive shaft axis; a first torque transfer device arranged to transfer torque from the drive shaft to a second shaft, the second shaft being rotatable about a second shaft axis parallel to and radially spaced from the drive shaft axis; and an output torque transfer device arranged to transfer torque from the second shaft to the housing of the motor; wherein, upon rotation of the drive shaft relative to the motor housing, the housing of the motor
(Continued)

is arranged to rotate relative to the position of the second shaft axis.

24 Claims, 15 Drawing Sheets

(51) Int. Cl.
*B25J 13/08* (2006.01)
*H02K 7/00* (2006.01)
*H02K 7/10* (2006.01)
*F16H 7/02* (2006.01)
*F16H 19/00* (2006.01)

(52) U.S. Cl.
CPC ............. *H02K 7/1012* (2013.01); *F16H 7/02* (2013.01); *F16H 19/005* (2013.01); *H02K 2213/03* (2013.01)

(56) References Cited

U.S. PATENT DOCUMENTS

| | | | |
|---|---|---|---|
| 4,351,197 A * | 9/1982 | Carson | F16H 19/005 74/506 |
| 4,398,110 A | 8/1983 | Flinchbaugh et al. | |
| 4,520,331 A | 5/1985 | Steidel | |
| 4,526,050 A | 7/1985 | Johnson | |
| 4,806,066 A | 2/1989 | Rhodes | |
| 4,903,536 A | 2/1990 | Salisbury, Jr. | |
| 5,046,375 A | 9/1991 | Salisbury, Jr. | |
| 5,415,593 A | 5/1995 | Mathews | |
| 5,562,556 A | 10/1996 | Carson | |
| 5,752,811 A | 5/1998 | Petro | |
| 5,777,410 A | 7/1998 | Asakura et al. | |
| 5,996,723 A | 12/1999 | Shimizu et al. | |
| 6,354,167 B1 | 3/2002 | Snow | |
| D487,101 S | 2/2004 | Taoka | |
| D552,643 S | 10/2007 | Bonomi | |
| D585,843 S | 2/2009 | Sakaguchi et al. | |
| D638,454 S | 5/2011 | Torii et al. | |
| D639,321 S | 6/2011 | Torii et al. | |
| 8,181,552 B2 * | 5/2012 | Lee | B25J 9/1045 74/490.04 |
| D673,196 S | 12/2012 | von Hafen | |
| 8,596,159 B2 * | 12/2013 | Zhang | F16H 19/005 74/89.2 |
| D706,325 S | 6/2014 | Wada et al. | |
| D709,933 S | 7/2014 | Wu | |
| 8,858,374 B2 | 10/2014 | Townsend | |
| 8,910,781 B2 | 12/2014 | Pipes et al. | |
| D727,724 S | 4/2015 | Pipes et al. | |
| D730,961 S | 6/2015 | Kobayashi et al. | |
| D740,867 S | 10/2015 | Barta | |
| D747,745 S | 1/2016 | Sannomiya | |
| D767,656 S | 9/2016 | Wu | |
| 9,512,912 B1 | 12/2016 | Edsinger et al. | |
| D789,432 S | 6/2017 | Tokuda | |
| D790,616 S | 6/2017 | Tokuda | |
| D790,617 S | 6/2017 | Tokuda | |
| D843,425 S | 3/2019 | Higbie | |
| D851,146 S | 6/2019 | Thoni | |
| D851,215 S | 6/2019 | Arnold | |
| D852,247 S | 6/2019 | Taylor et al. | |
| D881,007 S | 4/2020 | Christianson | |
| D892,184 S | 8/2020 | Thoni | |
| D908,624 S | 1/2021 | Pope et al. | |
| D923,753 S | 6/2021 | O'Brien | |
| D958,213 S | 7/2022 | Klassen | |
| 2005/0282678 A1 | 12/2005 | Mundis | |
| 2006/0117885 A1 | 6/2006 | Robson et al. | |
| 2006/0142105 A1 | 6/2006 | Kudoh et al. | |
| 2006/0164030 A1 | 7/2006 | Kujira et al. | |
| 2008/0300083 A1 | 12/2008 | Max et al. | |
| 2009/0124446 A1 | 5/2009 | Miyoshi | |
| 2009/0227412 A1 | 9/2009 | Chang | |
| 2010/0064829 A1 | 3/2010 | Dale | |
| 2010/0064885 A1 | 3/2010 | Werkhoven | |
| 2010/0180708 A1 | 7/2010 | Nitz | |
| 2010/0259057 A1 | 10/2010 | Madhani | |
| 2011/0232930 A1 | 9/2011 | Zhang et al. | |
| 2011/0290049 A1 * | 12/2011 | Chen | F16H 19/005 74/89.2 |
| 2012/0286629 A1 | 11/2012 | Johnson et al. | |
| 2013/0196811 A1 | 8/2013 | Chen et al. | |
| 2013/0217531 A1 | 8/2013 | Kume et al. | |
| 2014/0033842 A1 | 2/2014 | Morin et al. | |
| 2014/0117788 A1 | 5/2014 | Takahashi et al. | |
| 2014/0132197 A1 | 5/2014 | Kanazawa et al. | |
| 2014/0319948 A1 | 10/2014 | Nagase et al. | |
| 2015/0007500 A1 | 1/2015 | Schatz | |
| 2015/0068349 A1 | 3/2015 | Hirabayashi | |
| 2015/0167798 A1 * | 6/2015 | Gosselin | B25J 9/1045 475/182 |
| 2016/0020668 A1 | 1/2016 | Ishikawa et al. | |
| 2016/0223060 A1 | 8/2016 | Yasui | |
| 2016/0290371 A1 | 10/2016 | Ryu et al. | |
| 2016/0305493 A1 | 10/2016 | Klassen | |
| 2016/0368216 A1 | 12/2016 | Chang | |
| 2017/0002905 A1 | 1/2017 | Sessions | |
| 2017/0023145 A1 | 1/2017 | Garrone et al. | |
| 2017/0059003 A1 | 3/2017 | Wagh et al. | |
| 2017/0102057 A1 | 4/2017 | Aubin-marchand | |
| 2017/0279333 A1 | 9/2017 | Xiao et al. | |
| 2018/0216392 A1 | 8/2018 | Rietdijk | |
| 2018/0335117 A1 | 11/2018 | Isono | |
| 2019/0107197 A1 | 4/2019 | Pezzotta et al. | |
| 2020/0200234 A1 | 6/2020 | Kinjo et al. | |
| 2020/0251951 A1 | 8/2020 | Kinjo et al. | |
| 2020/0376923 A1 | 12/2020 | Seck et al. | |
| 2022/0085691 A1 | 3/2022 | Gomis et al. | |

FOREIGN PATENT DOCUMENTS

| | | |
|---|---|---|
| CN | 101362327 A | 2/2009 |
| CN | 101456632 A | 6/2009 |
| CN | 101644123 A | 2/2010 |
| CN | 101786424 A | 7/2010 |
| CN | 101934731 A | 1/2011 |
| CN | 102072293 A | 5/2011 |
| CN | 102626930 A | 8/2012 |
| CN | 103203708 A | 7/2013 |
| CN | 103203722 A | 7/2013 |
| CN | 103557272 A | 2/2014 |
| CN | 104769236 A | 7/2015 |
| CN | 105485309 A | 4/2016 |
| CN | 105570403 A | 5/2016 |
| CN | 105965504 A | 9/2016 |
| CN | 107327543 A | 11/2017 |
| CN | 107387967 A | 11/2017 |
| CN | 107614365 A | 1/2018 |
| CN | 108368921 A | 8/2018 |
| CN | 109155568 A | 1/2019 |
| EP | 0534008 A1 | 3/1993 |
| EP | 2381910 A1 | 11/2011 |
| EP | 2564942 A2 | 3/2013 |
| EP | 3203111 A1 | 8/2017 |
| FR | 2841315 A1 | 12/2003 |
| GB | 972199 A | 10/1964 |
| GB | 2088987 A | 6/1982 |
| JP | 2004029283 A | 1/2004 |
| JP | 2005008143 A | 1/2005 |
| JP | 2005212657 A | 8/2005 |
| JP | 2010215204 A | 9/2010 |
| JP | 2012223081 A | 11/2012 |
| JP | 2017005826 A | 1/2017 |
| KR | 20120034832 A | 4/2012 |
| KR | 20120068332 A | 6/2012 |
| NO | 2020148706 A | 7/2020 |
| WO | 8600382 A1 | 1/1986 |
| WO | 2007052588 A1 | 5/2007 |
| WO | 2010127701 A1 | 11/2010 |
| WO | 2018218363 A1 | 12/2018 |

(56) References Cited

FOREIGN PATENT DOCUMENTS

WO      2020148692 A1      7/2020
WO      2020148705 A1      7/2020

OTHER PUBLICATIONS

Office Action received for EP Application No. 20702521.4, dated Jul. 12, 2022, 07 Pages.
Office Action received for EP Application No. 20702522.2, dated Jul. 14, 2022, 07 Pages.
Notice of Allowance Received for U.S. Appl. No. 29/766,300 dated Apr. 20, 2022, 8 Pages.
International Search Report and Written Opinion received for PCT Application No. PCT/IB2020/050353, dated Apr. 29, 2020, 13 pages.
International Search Report and Written Opinion received for PCT Application No. PCT/IB2020/050354, dated May 4, 2020, 15 pages.
International Search Report and Written Opinion received for PCT Application No. PCT/IB2020/050330, dated Apr. 30, 2020, 14 Pages.
Cun, H. et al., "Servo movement simulation of bionic hexapod robot based on Virtools," China Measurement & Test, vol. 38, No. 3, May 2012, pp. 4 (Abstract submitted).
Luan, Z.-H. et al., "Research on Planetary Gear Reducer with Torque Self-inspection," Journal of Anhui University of Science and Technology(Natural Science), vol. 36, No. 6, Nov. 2016, pp. 5 (Abstract submitted).
Zhao, L. et al., "Design of the Planetary Gear Train of a New-type Hybrid Power Split Unit," Mechanical Science and Technology for Aerospace Engineering, vol. 29, No. 10, Oct. 2010, pp. 3, (Abstract submitted).
Lianhu, Sun, "Spiral drive rope guide", Anhui Institute of Geological Sciences, 1987, 3 pages.
Wei, L. et al., "Design of the Coiler for the Strip with Light Section", China Academic Journal Electronic Publishing House, Issue 4, 2009, 3 pages. (Abstract Submitted).
Woo, S., "Development of energy-saving technology for front-end belt transmission system", China Academic Journal Electronic Publishing House, Issue 6, 2014, 6 pages. (Abstract Submitted).
Jiang Changjun et al. "Mini circular saw design", Electric Tool. 2012, 04 pages. (Abstract).
Qu Kai Ke "Parallel dual-axis anti-phase synchronous drive device", Electrictronics Tool. 2013, 02 pages. (Abstract).
Non-Final office action received for U.S. Appl. No. 17/418,897, mailed on Apr. 10, 2024, 08 pages.

* cited by examiner

ACTUATOR ARRANGEMENT

RELATED APPLICATIONS

This application is a National Phase of International Application No. PCT/IB2020/050330, filed on Jan. 16, 2020, which claims the benefit of U.S. Provisional Application No. 62/793,026, filed on Jan. 16, 2019 and Great Britain Application No. 1915013.5 filed on Oct. 17, 2019, each of which are incorporated herein by reference in their entirety.

FIELD OF THE DISCLOSURE

This disclosure relates to an actuator and a robotic arm incorporating such an actuator.

BACKGROUND

Many machines, and in particular robots, rely on compact, lightweight actuators for moving arms and other members. The movement often requires high levels of precision and high torque, which can be difficult to achieve without significantly increasing the size or weight of the actuator.

Known actuators often comprise a motor and gear box arrangement for increasing the amount of torque delivered from an electric motor in order to be usable, and reducing the rotational speed at output relative to that at the drive shaft of the motor. It is common that the gear box is designed and built separately from the motor and this can have the drawback that the axial extent of the overall actuator arrangement is disadvantageously large.

Known actuators may also suffer from low efficiency or from high levels of inertia, which may reduce the precision of the movement.

The present disclosure seeks to address at least some of the above problems.

SUMMARY OF THE INVENTION

According to a first aspect of the invention, there is provided an actuator comprising: a motor having a housing and a drive shaft, the motor arranged to rotate the drive shaft relative to the housing about a drive shaft axis; a first torque transfer device arranged to transfer torque from the drive shaft to a second shaft, the second shaft being rotatable about a second shaft axis spaced from the drive shaft axis; and an output torque transfer device arranged to transfer torque from the second shaft to the housing of the motor; wherein, upon rotation of the drive shaft relative to the motor housing, the housing of the motor is arranged to rotate relative to the position of the second shaft axis.

Depending on which components of the actuators are considered fixed, the actuator may be considered to operate by the housing of the motor being arranged to rotate about the drive shaft axis, or by the second shaft being arranged to orbit the drive shaft axis and/or the housing of the motor. These two concepts may be substantially similar, but may have alternative portions fixed relative to external components and alternative portions used as output members. Hence, whether the second shaft axis, and accordingly the second shaft, orbits the motor or whether the motor housing may rotate may be a question of reference frame. In either case, rotation of the motor housing relative to the position of the second shaft axis may be created. The motor housing is generally the part to which static parts of the motor are mounted, such as any integrated control electronics and in particular the stator of the motor.

With the actuator arrangement according to the first aspect, there may be provided a more compact actuator. In particular the volume taken up by a motor may be accommodated within a torque transfer device, reducing the overall volume of the actuator.

Torque transfer devices as described herein may be, but are not limited to, pulleys and gears and a torque transfer device may comprise two gears on different shafts, the gears having teeth interlocking with each other or with an intermediate gear, or two pulleys on different shafts connected by at least one cable or band. Torque may be transferred keeping a speed of rotation and level of torque constant or may involve a level of mechanical advantage, by using gears having different numbers of teeth or pulleys having different radii. In certain embodiments, toothless rollers may be used in a similar manner to toothed gears, where differing radii or differing diameters of rollers are used to create a desired ratio of input torque and speed to output torque and speed.

The actuator may further comprise a second shaft mount, which is optionally arranged to be fixed to a component external to the actuator, which is rotatably coupled to the motor housing, and arranged to support the second shaft. The second shaft mount may thereby allow the second shaft to move, such that the second shaft axis translates in a circular motion relative to the motor housing and allows an output to be taken as movement of the motor housing relative to the orbit or translation of the second shaft. This may provide a high level of mechanical advantage relative to the motor.

The second shaft mount may be arranged to support the second shaft at two axially spaced support locations. This may allow the second shaft to be supported more stably.

The output torque transfer device may be coupled to the second shaft between the two support locations. Since the output torque transfer device is likely to have a higher torque than the first torque transfer device, and thus a higher tensile force between the two components of the torque transfer device, it is preferable that it is not supported on a cantilevered shaft, which may induce undesirable bending stresses in the shaft. A pulley or gear of the output torque transfer device may therefore be mounted on the second shaft between the two support locations.

At least one of the first and second torque transfer devices may comprise a pulley system. Pulley systems may have lower moments of inertia about their shafts than gear arrangements and may thereby allow improved control of the actuator position.

The first torque transfer device may be arranged such that the torque provided to the second shaft is greater than the torque provided to the drive shaft, and/or the output torque transfer device may be arranged such that the torque provided to the motor housing is greater than the torque provided to the second shaft. Since electric motors often operate with a higher rotational speed than is desirable for robotic actuators, but with a lower torque, this may improve the suitability of the actuator for use in a robot arm.

The actuator may further comprise an outer housing fixed to the motor housing, the outer housing enclosing at least one of the second shaft, the motor and the first and second torque transfer devices, and the outer housing may optionally enclose all of these components. The outer housing may thereby provide a self-contained actuator, and may provide protection to the internal components.

The outer housing may be arranged to be fixed to a second component external to the actuator. This may allow the outer housing to be used as an output from the actuator or may allow secure mounting of the actuator.

A torque ratio, or mechanical advantage, of the first and final torque transfer devices may be substantially the same. This may allow more efficient drive and may provide a more efficient use of space, as the sizes of the torque transfer devices may be similar.

The second shaft and the motor housing may have a relative rotational or orbital range of less than 160 degrees, optionally less than 140 degrees. By not requiring that the actuator can complete a complete rotation, cross members may be implemented in the second shaft support housing or in an outer housing, substantially parallel to the second shaft, and cable-based pulleys i.e. pulley arrangements having at least one cable fixed to at least one pulley (as opposed to belt-based pulleys) may be used. This may allow improved precision of movement and greater stability for the actuator.

An output of the actuator may be provided at a member arranged to rotate about the drive shaft axis i.e. having a rotational axis co-linear with the drive shaft axis. By having the output of the actuator centred about the same axis as the motor housing, the actuator may be more well-balanced.

The second shaft may overlap the motor in a direction along the drive shaft access. Put another way, the second shaft may run alongside and parallel to the motor and in particular alongside the motor housing. This may reduce the axial extent of the actuator and may thereby provide a more compact actuator.

A component of the first torque transfer device, which may be a pulley or gear, fixed to the second shaft may overlap the motor housing in a radial direction. Put another way, the component of the first torque transfer device may be arranged parallel to an axial end face of the motor or motor housing and may be alongside it at some point. This may reduce a radial extent of the actuator and may thereby provide a more compact actuator.

The output torque transfer device may comprise a third shaft, a second torque transfer device arranged to transfer torque from the second shaft to the third shaft, and a third torque transfer device arranged to transfer torque from the third shaft to the motor housing. By providing three torque transfer devices, the mechanical advantage of the actuator over the motor may be improved. Fourth or fifth torque transfer devices may also be employed.

The actuator may further comprise a plurality of encoders, each encoder arranged to measure a rotational position of the drive shaft, second shaft or motor housing relative to the motor housing or second shaft mount as appropriate. Such encoders may provide data indicative of wear of the actuator, position of the actuator, and speed of the actuator. The encoders may also be interpreted to determine strain within the torque transfer devices and may thereby be used to determine torque delivered from the motor and/or by the actuator.

The actuator may further comprise a control system arranged: to determine a strain within at least one of the torque transfer devices from data provided by the encoders, and to determine an output torque provided by the actuator based on the strain. In particular, where the torque transfer devices are pulleys, strain in the cables or bands between the pulleys may be determined from the actuators and may be used to determine the torque provided by the actuator. This may allow improved control of the actuator and may provide an indication of wear of the actuator, allowing pre-emptive maintenance of the actuator to be carried out before failure.

The actuator may further comprise an electrical cable arranged to provide power to the motor from a location outside the actuator, the electrical cable extending at least partially around the drive shaft and/or the motor housing. Optionally, the electrical cable may have a 180 degree bend, so that it extends at least partially around the drive shaft and/or the motor housing in a first direction before the bend and extends at least partially around the drive shaft and/or the motor housing in a second direction after the bend. With such an arrangement, where a motor housing may be movable or rotatable relative to an adjacent member, from which power is supplied, power may still be supplied to the motor by allowing movement of the electrical cable. The electrical cable may extend through the actuator in order to provide power and/or information to and/or from distal parts of a mechanism, downstream of the actuator.

The electrical cable may have a cross section which is elongated in a direction parallel to the drive shaft axis. This may allow the cable to be thinner in a direction perpendicular to the drive shaft axis and thereby allow increased flexibility of the cable for extending at least partially around the drive shaft and/or the motor housing.

According to a second aspect of the invention, there is provided a robotic arm comprising a first member, a second member and a joint where the first and second members join, wherein an actuator according to any aspect is situated at the joint and configured to actuate the joint to move the first member relative to the second member.

The second member may be an upper arm, the first member may be a forearm, and the joint may be an elbow joint.

The position of the second shaft axis may be fixed relative to the upper arm or to the forearm, and the motor housing may be fixed relative to the forearm or the upper arm respectively.

According to a third aspect of the invention, there is provided an actuator comprising: a motor having a housing and a drive shaft, the motor arranged to rotate the drive shaft relative to the housing about a drive shaft axis; a first torque transfer device arranged to transfer torque from the drive shaft to a second shaft, the second shaft being rotatable about a second shaft axis spaced from the drive shaft axis; and an output torque transfer device arranged to transfer torque from the second shaft to an output member, the output member being arranged to rotate about an output axis.

The output axis may be coaxial with the drive shaft axis.

By having the drive shaft axis and the output axis coaxial, the motor may be arranged centrally within the actuator and therefore the moment of inertia of the actuator may be reduced. This may improve the acceleration and the precision of the actuator.

The motor may be arranged at least partially within the output member. This may save space within the actuator and may therefore allow a more compact design.

The output member may be fixedly attached relative to the stator of the motor, and/or fixed to the housing of the motor.

According to a fourth aspect of the invention, there is provided: an actuator comprising: a motor having a housing and a drive shaft, the motor arranged to rotate the drive shaft relative to the housing about a drive shaft axis; a first torque transfer device arranged to transfer torque from the drive shaft to a second shaft, the second shaft being rotatable about a second shaft axis spaced from the drive shaft axis; and an output torque transfer device arranged to transfer torque from the second shaft to an output member, the output member being arranged to rotate about an output axis; wherein the motor is arranged at least partially within the output member.

The output member may be substantially annular and/or may be a pulley.

An actuator comprising: a motor having a housing, a stator, a rotor, and a drive shaft, the motor arranged to rotate the drive shaft relative to the housing about a drive shaft axis; a first torque transfer device arranged to transfer torque from the drive shaft to a second shaft, the second shaft being rotatable about a second shaft axis spaced from the drive shaft axis; and an output torque transfer device arranged to transfer torque from the second shaft to an output member, the output member being arranged to rotate about an output axis; wherein the output member is fixedly attached relative to the stator of the motor.

Any of the optional aspects described above with reference to the first aspect may be incorporated into the second, third and fourth aspects.

BRIEF DESCRIPTION OF THE DRAWINGS

Embodiments of the invention will now be described, by way of example only, with reference to the accompanying drawings, in which.

DETAILED DESCRIPTION

Figure 1:
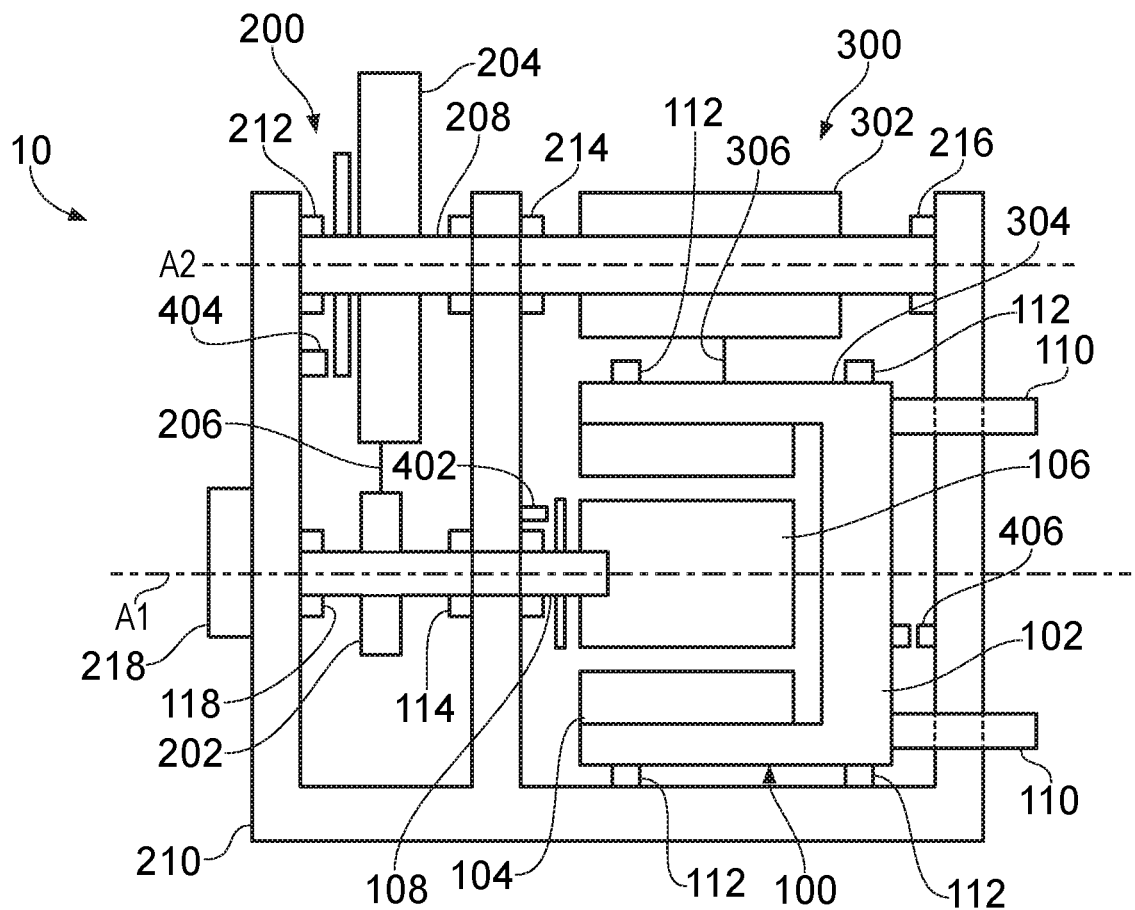
FIG. 1 shows a schematic drawing of an actuator according to the present disclosure.

FIG. 1 shows a schematic diagram of an actuator 10 according to the present disclosure. The actuator has a motor 100, having a stator 104 and a rotor 106, the stator 104 and rotor 106 being arranged to generate a torque between them. The stator 104 is fixed to a motor housing 102, which encloses the motor 100. The rotor 106 is fixed to a drive shaft 108, which extends out of the housing 102 and the rotor 106 and drive shaft 108 are arranged to rotate about a drive shaft axis A1 relative to the stator 104 and motor housing 102, due to the torque generated within the motor 100.

The drive shaft 108 is coupled to a first torque transfer device 200, and in particular to a first pulley 202 of the torque transfer device 200. The first pulley 202 is coupled to a second pulley 204 via at least one cable 206 and the cable 206 may be fixed to the first and/or second pulley 204 and/or may pass radially through at least one of the pulleys 202, 204. The second pulley 204 is fixed to a second shaft 208, which is rotatable about a second shaft axis A2, and supported by a second shaft mount 210. The second shaft mount 210 is rotatably mounted to the motor housing 102 and/or the drive shaft 108 so as to be about the drive shaft axis A1 relative to the motor housing 102 and therefore supports the second shaft 208, such that the second shaft 208 may orbit the motor 100, the second shaft axis A2 orbiting the motor 100 with the second shaft 208.

The actuator 10 also comprises a second torque transfer device 300 the second torque transfer device 300 having a third pulley 302, which is fixed to the second shaft 208 and a fourth pulley 304, which is fixed to the motor housing 102 and may be an integral part of the motor housing 102. The fourth pulley 304 may thereby surround the motor housing 102 and the stator 104. The third and fourth pulleys 302, 304 are coupled via a cable 306, which may also be two or four cables.

By this arrangement, the torque generated by the motor 100 is arranged to rotate the second shaft mount 210 when the motor housing 102 is held stationary, such that the second shaft axis A2 and the second shaft 208 orbit the motor 100. Alternatively, where the second shaft mount 210 is held stationary, the motor housing 102 and fourth pulley 304 may rotate.

In order to fix a part of the actuator 10 to be stationary and/or to take an output torque from the actuator 10, there is provided a fixed plate 218, which is fixed to the second shaft mount 210 and there is provided a motor output member 110, fixed to the motor housing 102. Both of the fixed plate 218 and motor output member 110 may be fixed to external components and the relative rotation of the motor housing 102 or the second shaft mount 210 may be a question simply of reference frame and determined by which external components are considered to be fixed and which are considered to be movable. It will be understood that the actuator 10 as a whole may be fixed to or form part of a moveable member or vehicle and may therefore not be fixed in an absolute sense.

Further, optional components are also shown in FIG. 1. These include bearings. The bearings shown are exemplary and certain bearings may be omitted or moved. There may be a motor housing bearing 112 disposed about the motor housing 102 and between the motor housing 102 and the second shaft mount 210. There may also be a first drive shaft bearing 114 and a second drive shaft bearing 118 between the drive shaft and the second shaft mount 210. The second shaft 208 may be supported on the second shaft mount 210 by first bearings 212, second bearings 214 and third bearings 216. The bearings may be arranged such that the second and third bearings 214, 216 are disposed either side of the third pulley 302 so that the second shaft 208 is supported on both sides of the third pulley 302.

The actuator 10 may also comprise a plurality of encoders arranged to determine relative rotational positions of components. A first encoder 402 may measure a relative angular position of the drive shaft 108 relative to the second shaft mount 210, a second encoder 404 may measure a relative position of the second pulley 204 and thereby a relative position of the second shaft 208 relative to the second shaft mount 210 (or may measure a position of the second shaft 208 relative to the second shaft mount 210 directly), and a third encoder 406 may measure a position of the motor housing 102 relative to the second shaft mount 210.

By measuring relative rotational positions of the drive shaft, the motor housing and the second shaft 108, 208, 102, strain in the torque transfer devices can be determined. In particular, strain in the cables 206, 306 between pulleys of the torque transfer devices 200, 300 can be determined (it may be assumed that strain within the solid, fixed components of the torque transfer devices i.e. the pulleys and the shafts, may be negligible) and thereby torque in the actuator 10 may be determined. Observation of the encoder readings over time may also give an indication of creep in the cables, and may indicate wear.

In some arrangements, only two encoders may be used, for example the first and second encoders 402, 404, as the strain in the first cable 206 alone may be sufficient to determine the torque delivered by the actuator 10.

The cables used may be formed of Kevlar, as Kevlar may have particularly easily determined tensile stress, for a given strain and may have sufficient strength to provide the required torque from the actuator. The cables 206a, b in the first torque transfer device 200 may carry less tension than the cables 306a, b of the second torque transfer device 300. The cables 206a, b of the first torque transfer device 200 may therefore be thinner, or have a smaller diameter or cross-section, than the cables 306a, b of the second torque transfer device 300.

Figure 2:
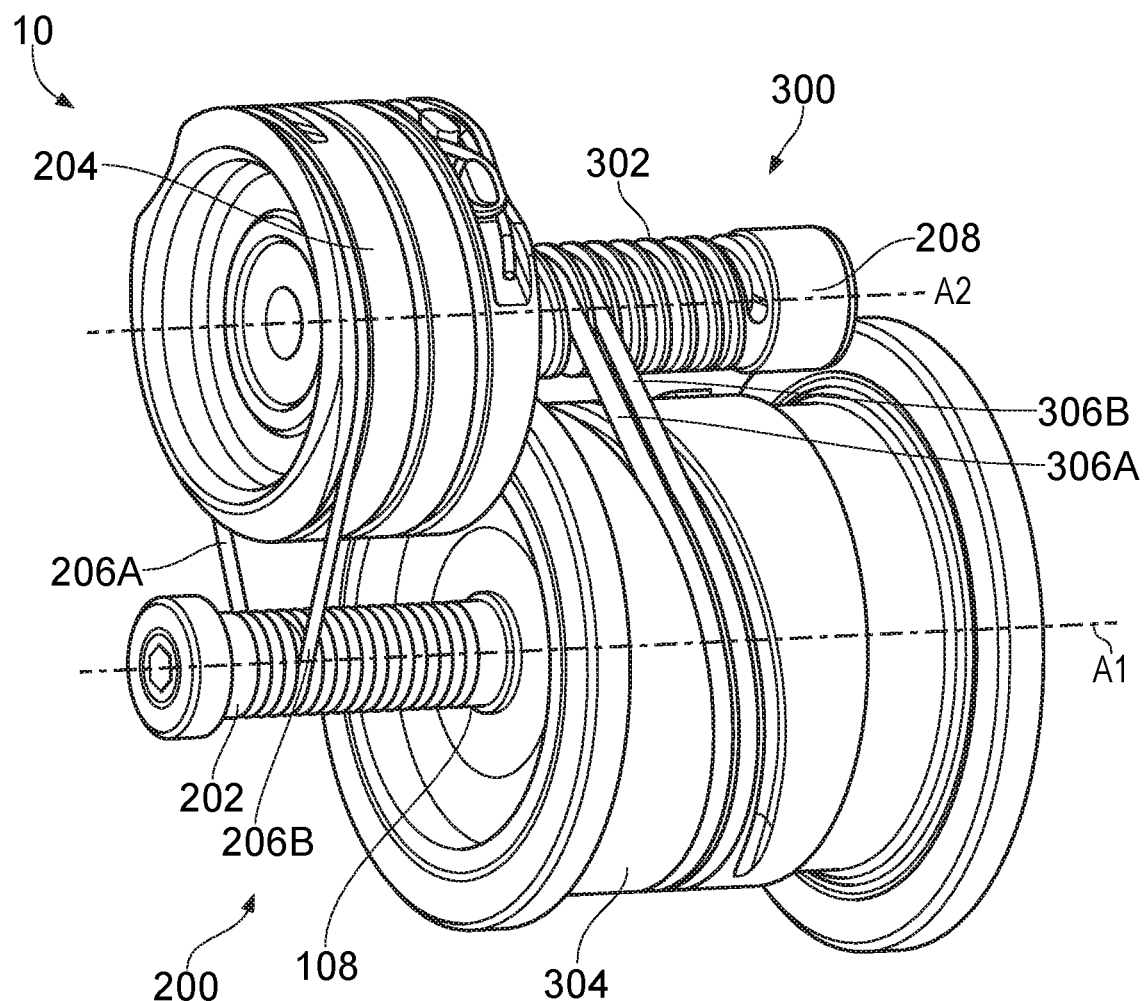
FIG. 2 shows a perspective view of two torque transfer devices for use in an actuator according to the disclosure.

FIG. 2 shows the first and second torque transfer devices 200, 300 of the actuator 10, with the other parts removed for clarity. It will be understood that the motor 100 may be inside the fourth pulley 304 and that the drive shaft 108 extends from the motor 100. It can also be seen that the first pulley 208 may be formed intrinsically with the drive shaft 108, and may comprise a helical groove formed on an outer surface of the drive shaft 108. Two cables 206a, 206b are wound around the first pulley 202, lying within the helical groove and may be wound so that, when the first pulley 202 is rotated about the drive shaft axis A1, a first cable 206a is wound further onto the first pulley 202 and a second cable 206b is wound from the first pulley 202. The two cables 206a, 206b may be wound so as to end at opposite ends of the first pulley 202 or may extend through the first pulley 202 radially and meet inside the first pulley 202. The cables 206a, 206b are also wound around a second pulley 204 and may lie in helical grooves of the second pulley 204. The two cables 206a, 206b may be separate portions of a single cable, joined at or inside the first or second pulley 202, 204.

The two cables 206a, b may be parallel in the region where they extend between the first pulley 202 and the second pulley 204. This may reduce the prospect of the two cables 206a, b touching or interfering with each other during operation of the actuator 10. With such an arrangement, the first and second pulleys 202, 204 will be arranged to rotate in the same direction.

The second pulley 204 is connected to a second shaft 208, which is also connected to a third pulley 302, the third pulley 302 forming part of the second torque transfer device 300. The second pulley 204 and third pulley 302 may have substantially different diameters, and their diameters may have a ratio in line with the mechanical advantage of each individual torque transfer device 200, 300. Specifically, the second pulley 204 may have a radius approximately five times that of the first pulley 202 and the fourth pulley 304 may have a radius approximately five times that of the third pulley 302. Therefore, in order to allow a compact arrangement, the second pulley 204 may have a radius approximately five times that of the third pulley 302. Numbers other than five may be used, with the principle of the ratios of radii between the first-to-second pulleys 202, 204 and third-to-fourth pulleys 302, 304 being substantially the same remaining.

The third pulley 302 may be coupled to the fourth pulley 304 via four cables, of which only two 306a, 306b are shown. Two parallel cables may be wound onto the third pulley 302 in interleaved helices as a single cable would have a significantly larger diameter, thereby requiring greater bending stresses to be imparted to the cable.

The four cables between the third and fourth pulleys 302, 304 may be parallel in the region where they extend between the third pulley 302 and the fourth pulley 304. This may reduce the prospect of the cables touching or interfering with each other during operation of the actuator 10. With such an arrangement, the third and fourth pulleys 302, 304 will be arranged to rotate in the same direction.

Figure 3:
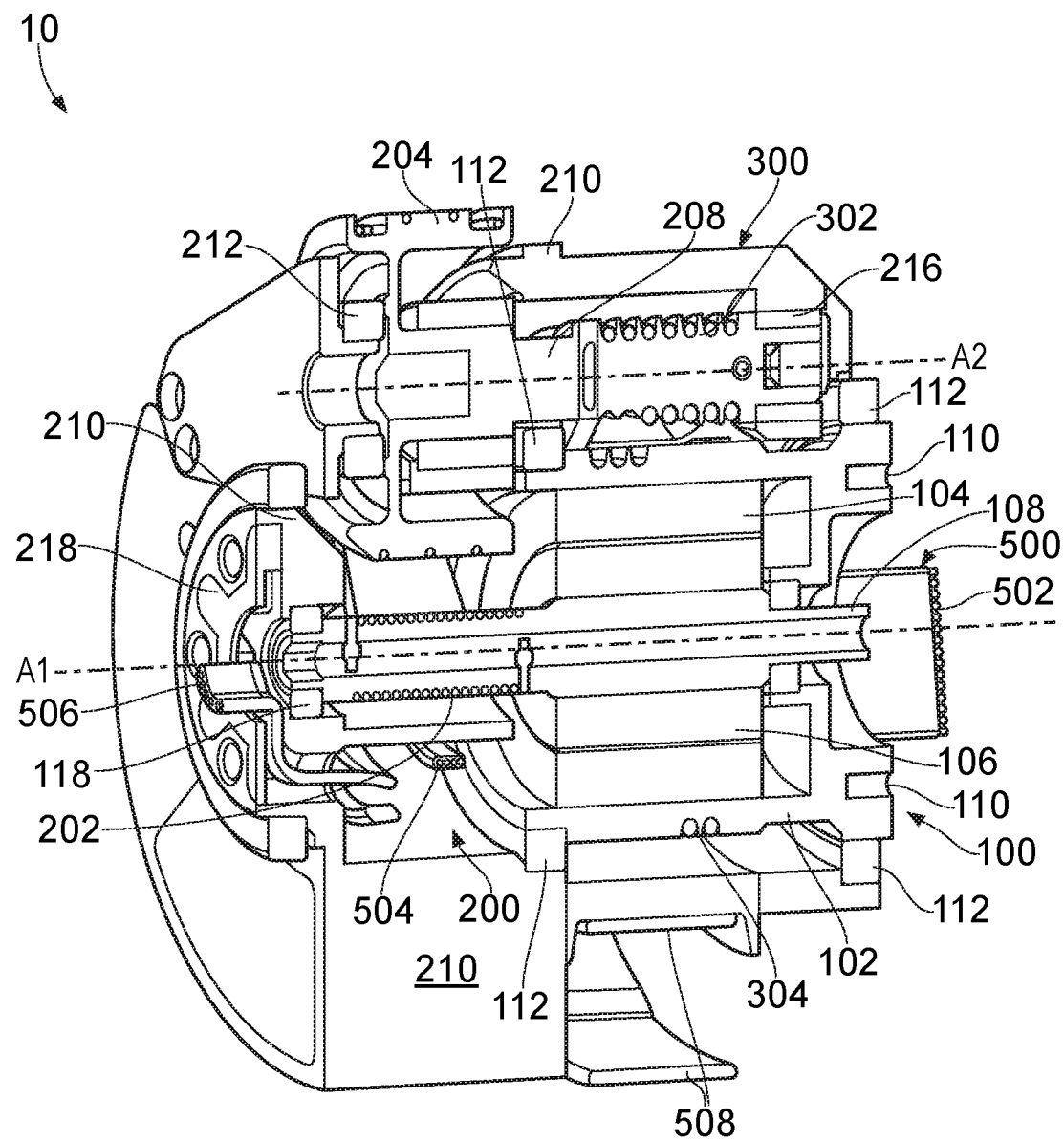
FIG. 3 shows a cross section of an actuator according to the disclosure.

FIG. 3 shows a detailed cross section of an actuator 10, showing the shape of the second shaft mount 210. The second shaft mount 210 may be substantially annular or semi-annular and may comprise a cross-member, disposed approximately parallel to the drive shaft axis A1 and the second shaft axis A2 and approximately diametrically opposite the second shaft axis A2, so that the drive shaft axis A1 is between the cross member and the second shaft axis A2.

An electrical cable 500, which may extend through the actuator 10 can also be seen in FIG. 3. A first end 502 of the electrical cable 500 is at an axial end of the actuator 10 adjacent the motor 100, and a second end 506 of the electrical cable 500 is adjacent the fixed plate 218. An intermediate end 504 of the electrical cable 500 may be an end of the electrical cable 500 within the actuator 10, which may carry electrical power to the motor 100 and/or may carry information from the encoders out of the actuator 10.

The electrical cable 500 may also have a loop portion 508, which may extend about the motor housing 102, and the loop (shown in full in FIG. 6) may move as the actuator rotates, moving the first end 502 relative to the second end 506. The thin cross section of the cable 500 can also be seen in FIG. 3, where the cross section is elongated in a direction along the drive shaft axis A1. This may help to form the loop portion 508. The cross section of the cable 500 is therefore elongated in a direction along the actuator axis A1, having a thinner cross section in a direction perpendicular to the actuator axis A1 (i.e. a radial direction).

Figure 4:
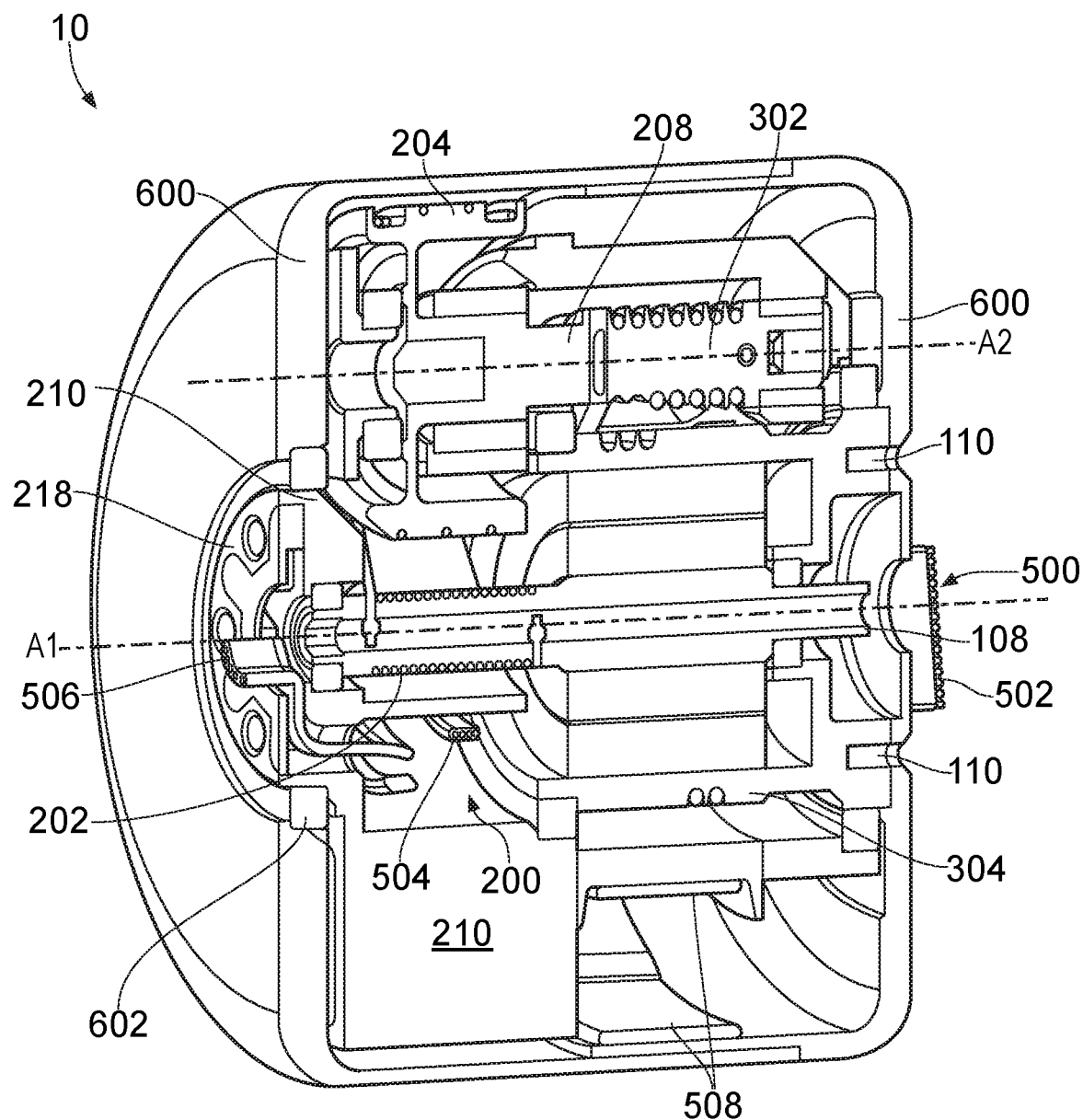
FIG. 4 shows a cross section of an actuator according to the disclosure.

FIG. 4 shows the actuator 10 with an outer housing 600 included. It can be seen that the outer housing 600 is coupled to the motor housing 102 via motor housing output members 110. The outer housing 600 also has a central hole at an opposite end to the motor 100, via which the fixing plate 218 coupled to the second shaft mount can be accessed. It can also be seen that the electrical cable 500 extends out of the outer housing 600 in both axial directions.

The outer housing 600 is substantially cylindrical, having a curved side surface and two axial end surfaces, and thereby encloses substantially all other components of the actuator 10, including the drive shaft 108, motor 100, first torque transfer device 200 and second torque transfer device 300 and all components thereof.

Figure 5:
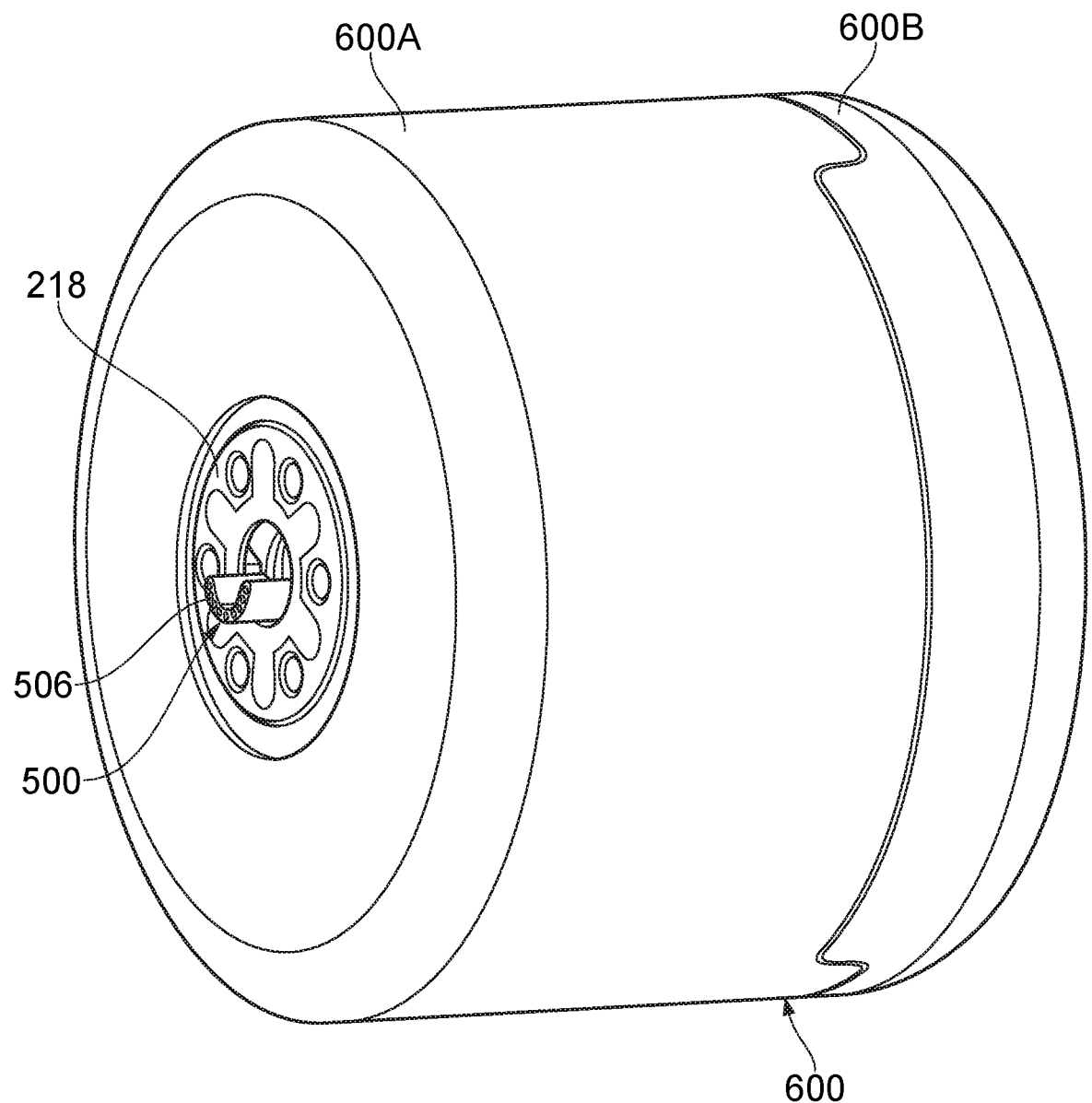
FIG. 5 shows a perspective view of an actuator according to the disclosure.

From FIG. 5, it can be seen that the outer housing 600 is formed from a first part 600a and a second part 600b, the first and second parts 600a, b each being substantially cylindrical and being axially separable. By forming the outer housing 600 from two such parts, the housing may be more easily constructed around the actuator 10.

The housing 600 may be 100 mm long and 100 mm in diameter. Preferably, a longest dimension of the housing 600 is less than 150 mm. The housing 600 preferably encloses the motor and the torque transfer devices. By providing a compact and cylindrical housing 600, the actuator may overall provide a package which is suited to use within humanoid robots.

There may be sufficient space inside the housing 600 adjacent the motor 100 for providing a brake (not shown). The brake may be arranged to provide a braking force to the drive shaft 108 and may therefore be positioned about the drive shaft 108 on an opposite side of the motor 100 from the first pulley 202. For this reason, the drive shaft 108 may extend through the motor 100 and may protrude from the motor 100 in two opposite directions.

Below are disclosed dimensions of three specific examples of actuator arrangements, each having a housing with a diameter of 100 mm. The smaller of the pulleys in each torque transfer device has a diameter of 10 mm.

In a first example, the motor has a diameter of 40 mm and both torque transfer devices have torque ratios of 4:1.

In a second example, the motor has a diameter of 50 mm, the first torque transfer device has a torque ratio of 3:1, and the output torque transfer device has a torque ratio of 5:1.

In a third example, the motor has a diameter of 60 mm, the first torque transfer device has a torque ratio of 2:1, and the output torque transfer device has a torque ratio of 6:1.

Figure 6:
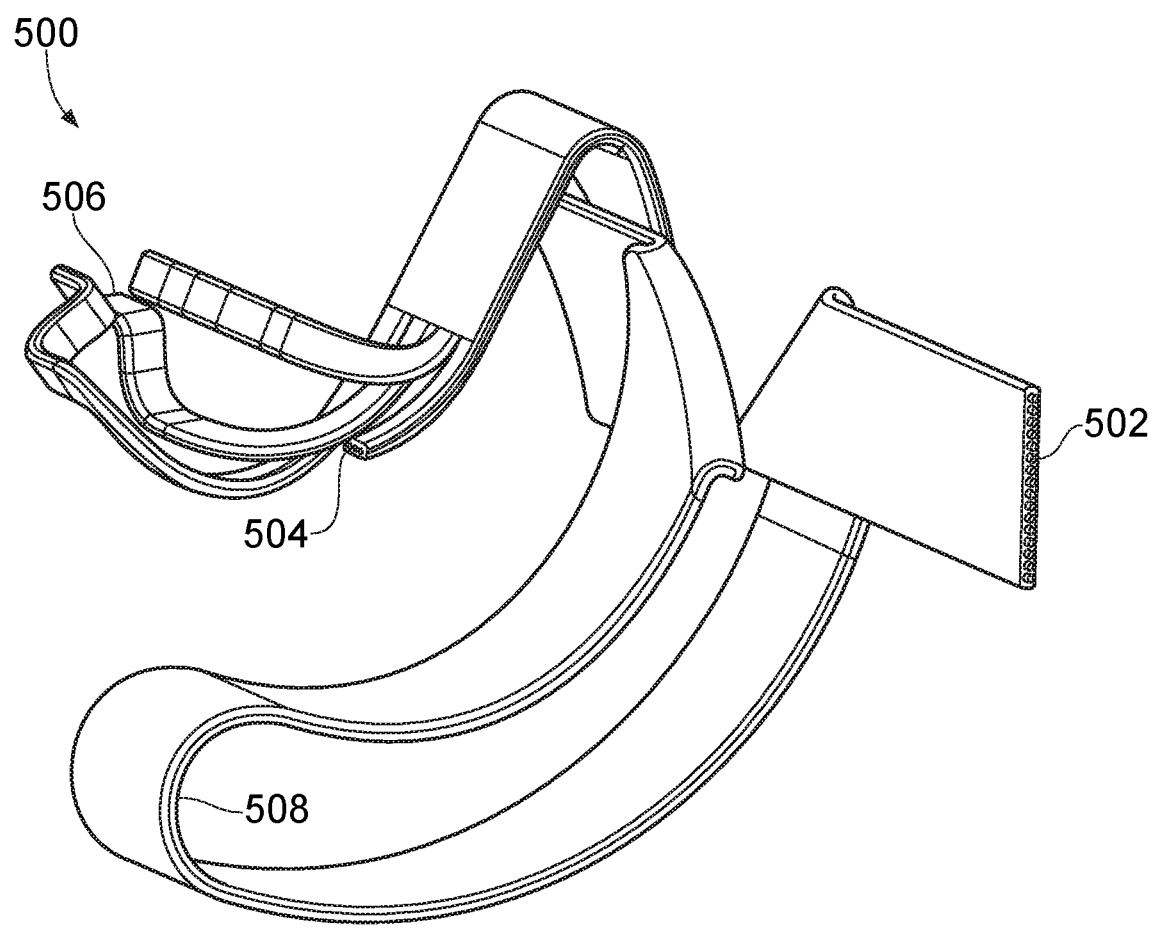
FIG. 6 shows an electrical cable for use in an actuator according to the disclosure.

FIG. 6 shows the full extent of the electrical cable 500 arranged to extend through the actuator 10, including the 180 degree loop portion 508, which may be movable as the actuator 10 rotates, in order to avoid stretching and potentially damaging the cable.

Figure 7:
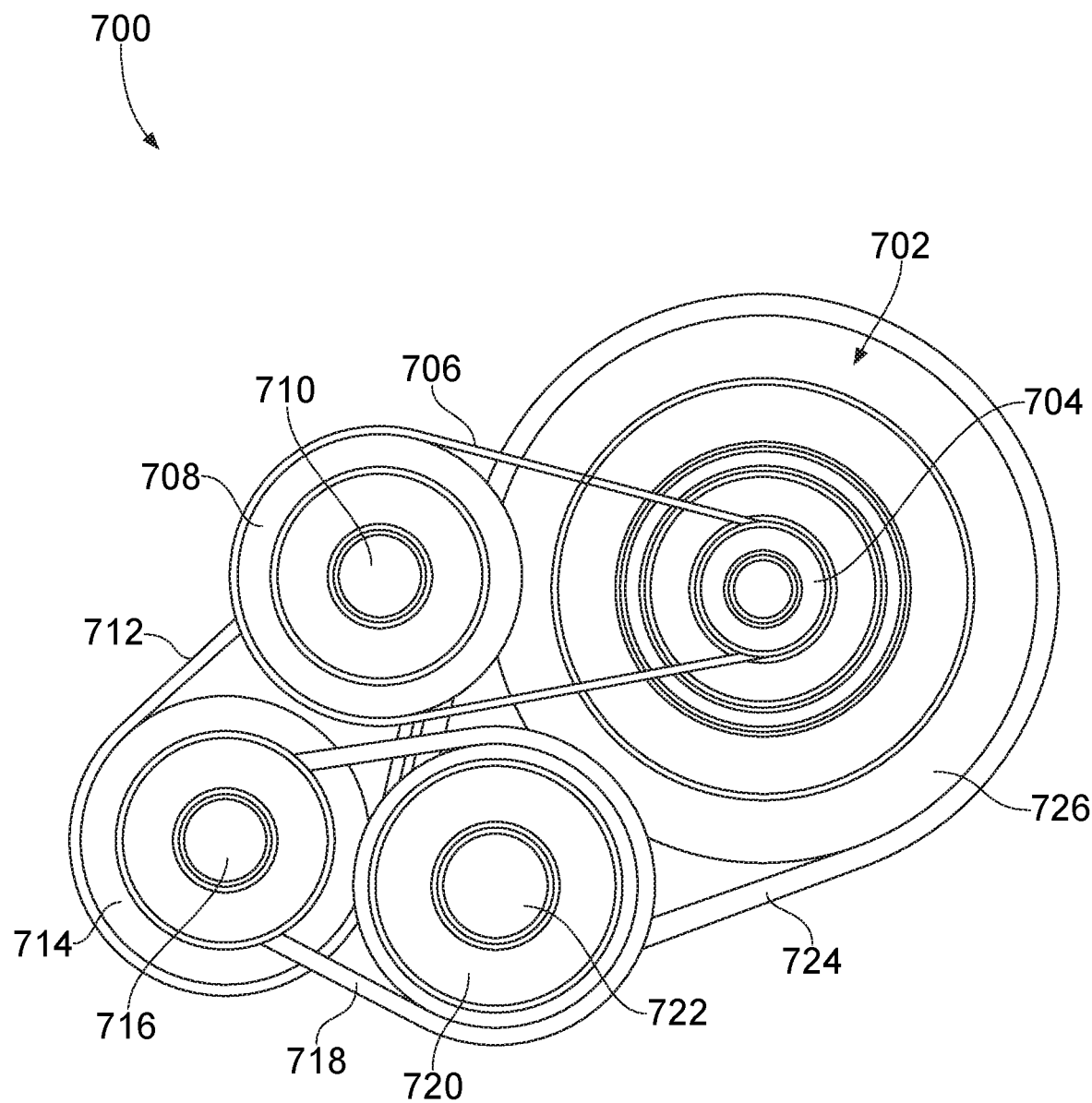
FIG. 7 shows a schematic view of a torque transfer device for use in an alternative actuator according to the disclosure.

FIG. 7 shows an alternative pulley arrangement 700. The arrangement is powered by a motor 702, only an end view of which is visible, and which is arranged to rotate a drive shaft and pulley 704. The drive shaft and first pulley 704 are coupled via a first cable or band 706 to a second pulley 708, which is on a shaft with a third pulley 710, the third pulley 710 being coupled to a fourth pulley 714 via a second cable or band 712. The fourth pulley 714 is coupled via a shaft to a fifth pulley 716, which is coupled via a cable or band 718 to a sixth pulley 720, which is coupled via a shaft to a seventh pulley 722, which is coupled by a further cable or band 724 to the motor housing, incorporating a final pulley 726.

The arrangement shown in FIG. 7 may be incorporated within an actuator substantially similar to that described above, but with further pulleys and shafts incorporated so as to increase the mechanical advantage obtainable.

It would be understood that, although arrangements having one second shaft and three second shafts as shown, arrangements having two shafts disposed away from the motor or four shafts disposed away from the motor may also be used.

Figure 8:
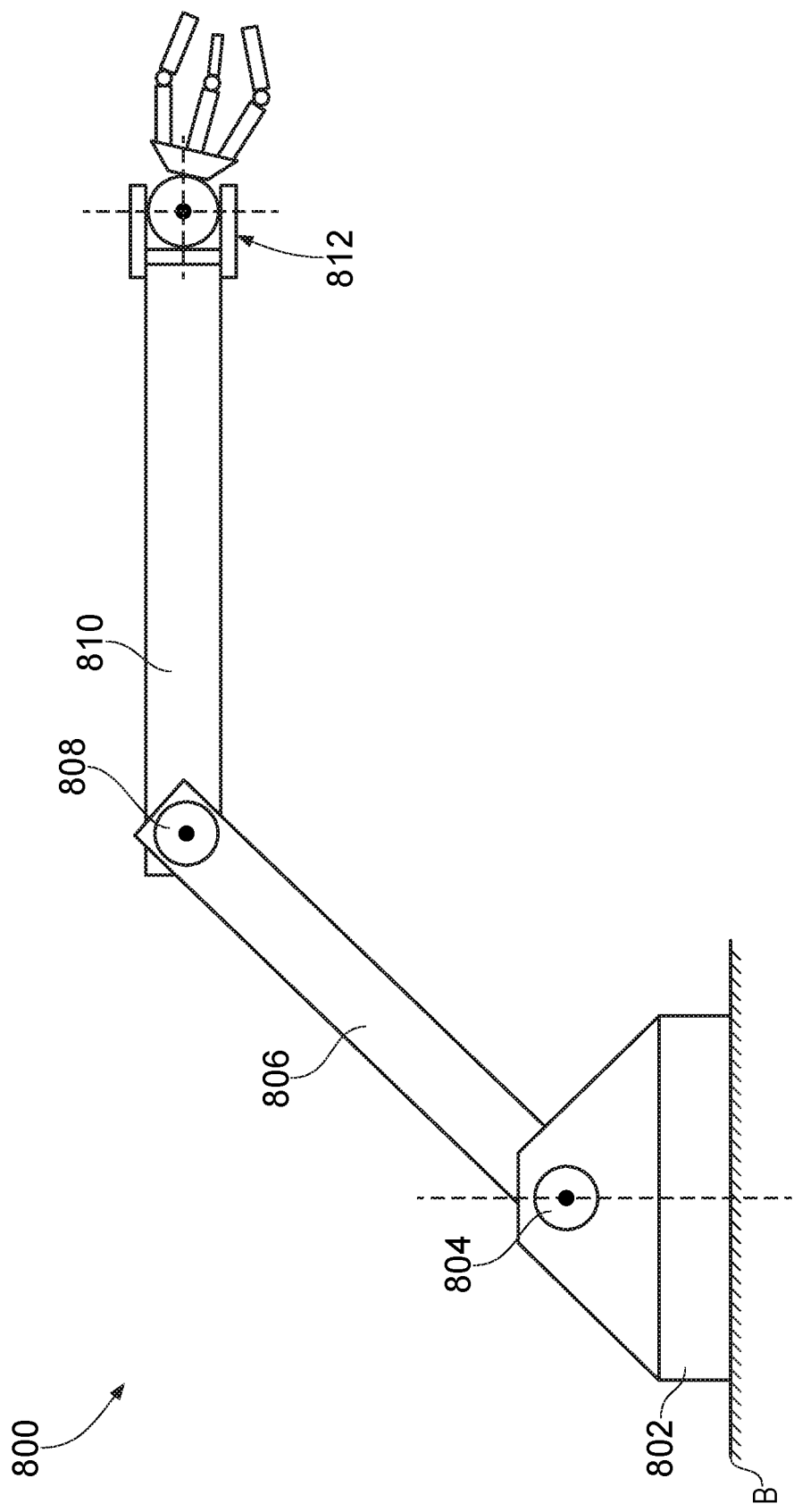
FIG. 8 shows a robot arm according to the disclosure.

FIG. 8 shows a robot arm 800. The robot arm 800 has a vertical axis actuator 802 fixed to a horizontal base B, and a shoulder joint 804 coupled to the vertical axis actuator 802 and arranged to move a first member 806, which may also be referred to as an upper arm 806. The upper arm 806 is coupled to a second member 810, which may also be referred to as a lower arm 810 or a forearm 810. The upper arm 806 is coupled to the forearm 810 at an elbow joint 808 and there is, at an end of the forearm 810 opposite the elbow joint 808, an end effector 812.

An actuator as described above may be placed at the elbow joint 808 or at the shoulder joint 804 and the second shaft mount 210 and fixation plate 218 may be fixed to any of the vertical actuator 802, upper arm 806 or lower arm 810 as appropriate.

Figure 9:
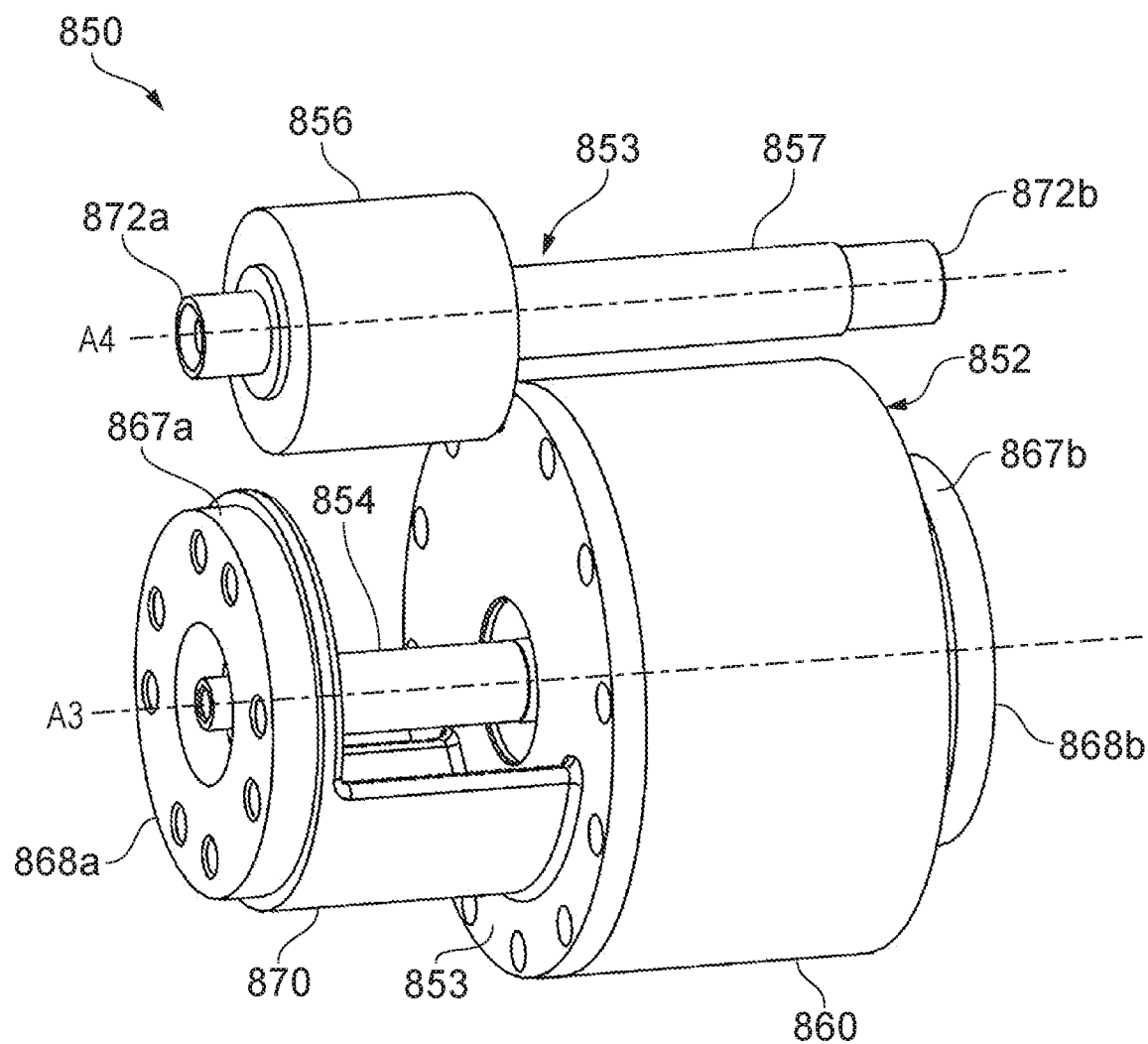
FIG. 9 shows a general view of selected parts of an alternative actuator assembly.

FIG. 9 shows an alternative actuator 850. The actuator 850 comprises a motor 852 having a housing 853 and a drive shaft 854 extending from the housing 853. The motor 852 is arranged to rotate the drive shaft 854 relative to the housing 853 about a drive shaft axis A3. The drive shaft 854 may also act as a pulley or may be fixed to a pulley and thus may drive a cable or band in order to rotate a second pulley 856.

The second pulley 856 is supported on a second shaft 853, which is arranged to rotate about a second shaft axis A4, spaced apart from the drive shaft axis A3. The second shaft 853 also has a third pulley 857, which is arranged to drive a band or cable fixed or otherwise coupled to a fourth pulley 860. The motor housing 853 is within, or may be fixed to or integral with the fourth pulley 860.

It will be understood that the above-described aspects of the alternative actuator 850 are substantially similar to corresponding aspects of the actuator 10 described previously. The alternative actuator 850 may therefore also share other features of the actuator 10 not explicitly described in conjunction with the alternative actuator 850.

Figure 10:
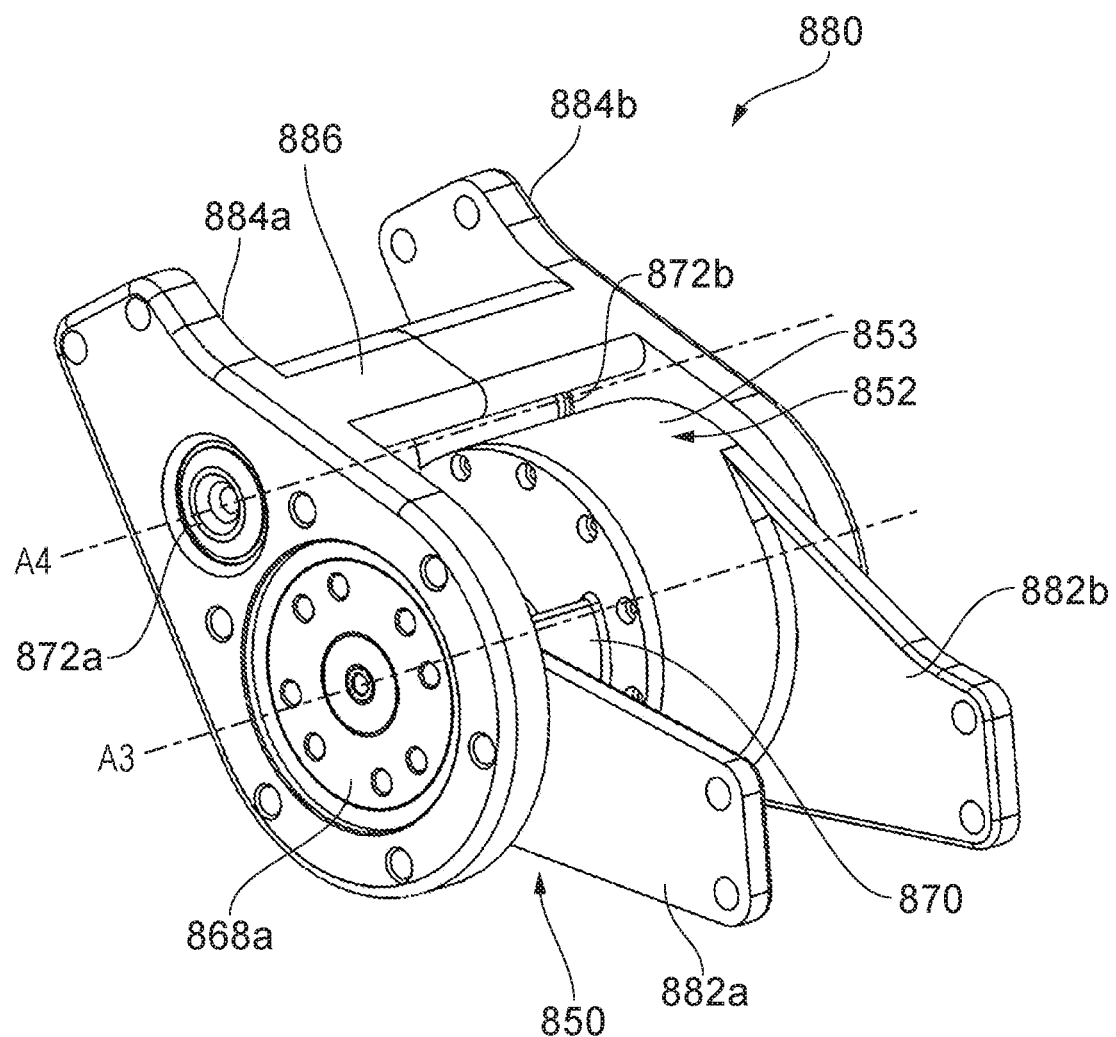
FIG. 10 shows a general view of a robotic joint incorporating the alternative actuator assembly.

FIG. 10 shows how the alternative actuator 850 may be incorporated within a robotic joint 880. The robotic joint 880 is arranged to pivot two members relative to each other about the drive shaft axis A3.

As shown in FIG. 10, the second shaft 853 is arranged to be supported by external members 884a, b. For this reason, the second shaft 853 has circular ends 872a, b, which may further comprise bearings, arranged to be received in corresponding holes in the external members 884a, b.

The external members 884a, b, are coupled to face flanges 868a, b, which each have bearing surfaces 867a, b, which are centred on the drive shaft axis A3 and the external members 884a, b are therefore arranged to rotate about the drive shaft axis A3.

The face flanges 868a, b have bolt holes to allow them to be coupled to further external parts. The face flanges 868a, b also act to provide resilient supports for respective bearing surfaces 867a, b.

The first face flange 868a is coupled to the motor housing 853 via a cross member 870. The cross member 870 has the shape of a sector of an annulus or of an extruded arc and extends partially around the drive shaft 854. By having this shape, the cross member 870 may provide good strength to the actuator 850. The portion of the actuator coupled to the cross member 870 at an end opposite to the motor housing 853 may also support the drive shaft 854 and may thereby improve the stiffness of the driveshaft 854.

A second of the bearing surfaces 867b is coupled to the motor housing 853 at an end opposite to the drive shaft 854. The second bearing surface 867b may be directly fixed to the motor housing 853.

The external members 884a, b are connected via a second cross member 886, which may improve the structural stiffness of the joint arrangement 880. The cross member 886 may also prevent separation of the external members 884a, b. The external members may be part of or may be fixed to or integral with a member of a robotic arm, such as the robotic arm 800 shown in FIG. 8.

An adjacent member of the robotic arm may be fixed to or integral with two further external members 882a, 882b. A first of the further external members 882a is fixed to the cross member 870 or between the cross member 870 and the first face flange 868a. A second of the further external members 882b is fixed to the motor housing 853.

As shown in FIG. 10, the second shaft 853 may be supported within a member of a robotic arm within which the actuator 850 is located. By increasing the separation distance between the drive shaft axis A3 and the second shaft axis A4, larger pulleys and/or a larger motor to be used and may therefore improvement of the torque supplied by the actuator 850 may be achieved without an increase in the size of the joint.

In a first example of the alternative actuator, the motor has a diameter of 60 mm, the first torque transfer device has a torque ratio of 4:1, and the output torque transfer device has a torque ratio of 6:1. The smaller of the pulleys in each torque transfer device has a diameter of 10 mm.

In a second example of the alternative actuator, the motor has a diameter of 90 mm, the first torque transfer device has a torque ratio of 4:1, and the output torque transfer device has a torque ratio of 9:1. The smaller of the pulleys in each torque transfer device has a diameter of 10 mm.

The improved torque conversion and motor size may be enabled by the spacing between the drive shaft axis and the second shaft axis allowed by the second shaft axis being supported by an external member.

Figure 11:
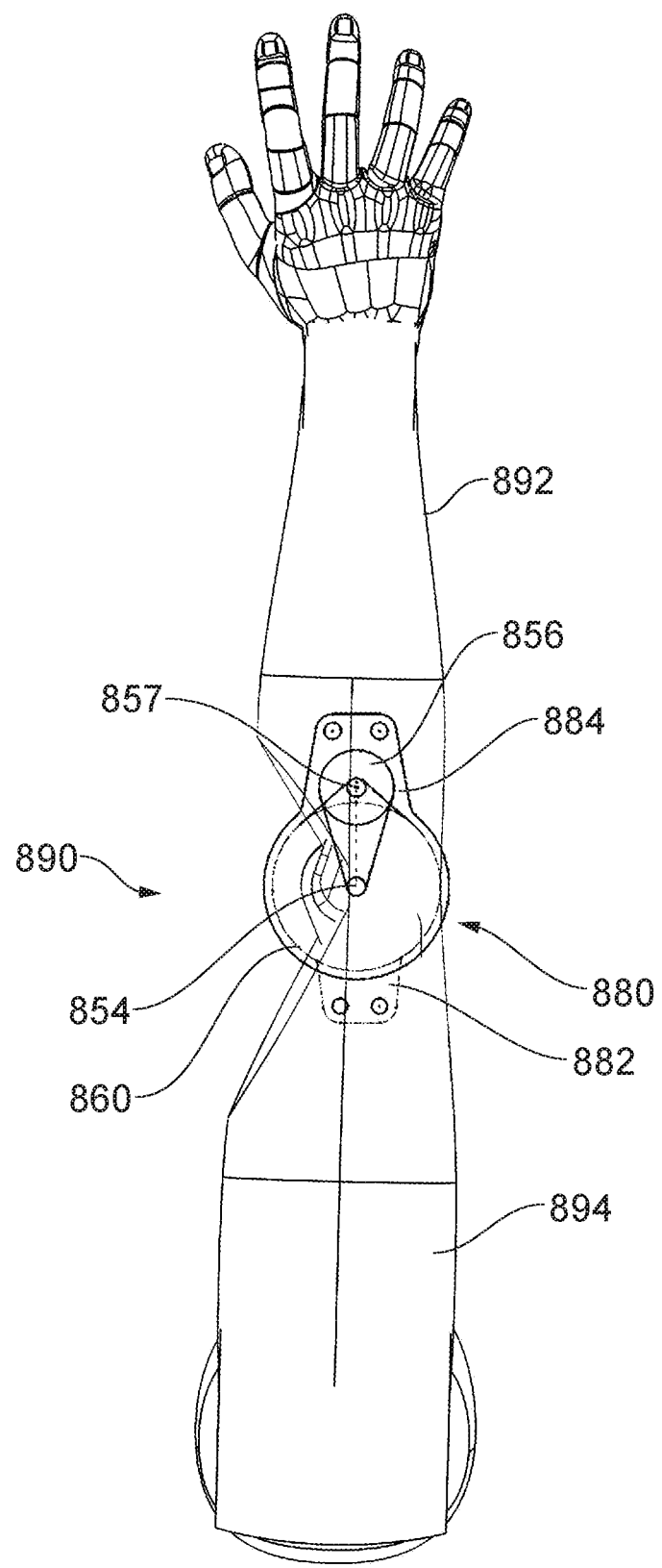
FIG. 11 shows a robotic arm incorporating the alternative actuator assembly.

FIG. 11 shows a robotic arm 890 incorporating the alternative actuator 850 and the robotic joint 880. The robotic arm has a first member 892, which is a lower arm and a second member 894 which is an upper arm. From FIG. 11, it can be seen that the envelope in which the actuator 850 lies sits comfortably within an elbow joint and that the external members 882, 884 may lie along the first and second members 892, 894.

Figure 12:
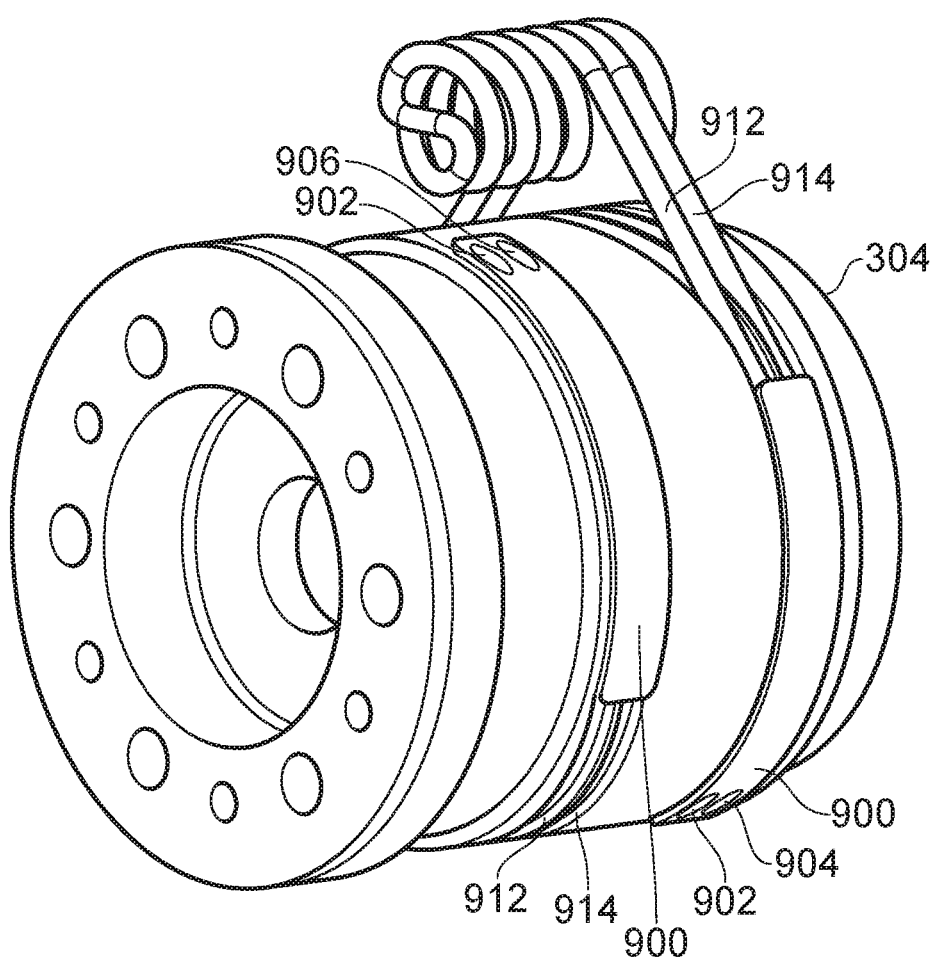
FIG. 12 shows a pulley connected to a cable arrangement.

FIG. 12 shows a reverse view of the fourth pulley 304, showing how the cable portions may be connected to the second pulley 304 via connectors 900.

From FIG. 12, it can be seen that the connectors 900 are substantially curved, having a similar curvature to that of the outer surface of the fourth pulley 304 and have cable portions 912, 914 extending away from the connectors, the cable portions 912, 914 being between a body of the connector 900 and the second pulley 304, and the cable portions 912, 914 are connected to the connectors 900 at fixation points 902, 906, which are located on the connectors 900 at an opposite end from that at which the cable portions 912, 914 extend away from the connectors 500.

It will be understood that the cable portions 912 may be the same cable portions as the first and second cable portions 306A, B shown in FIG. 2.

Figure 13:
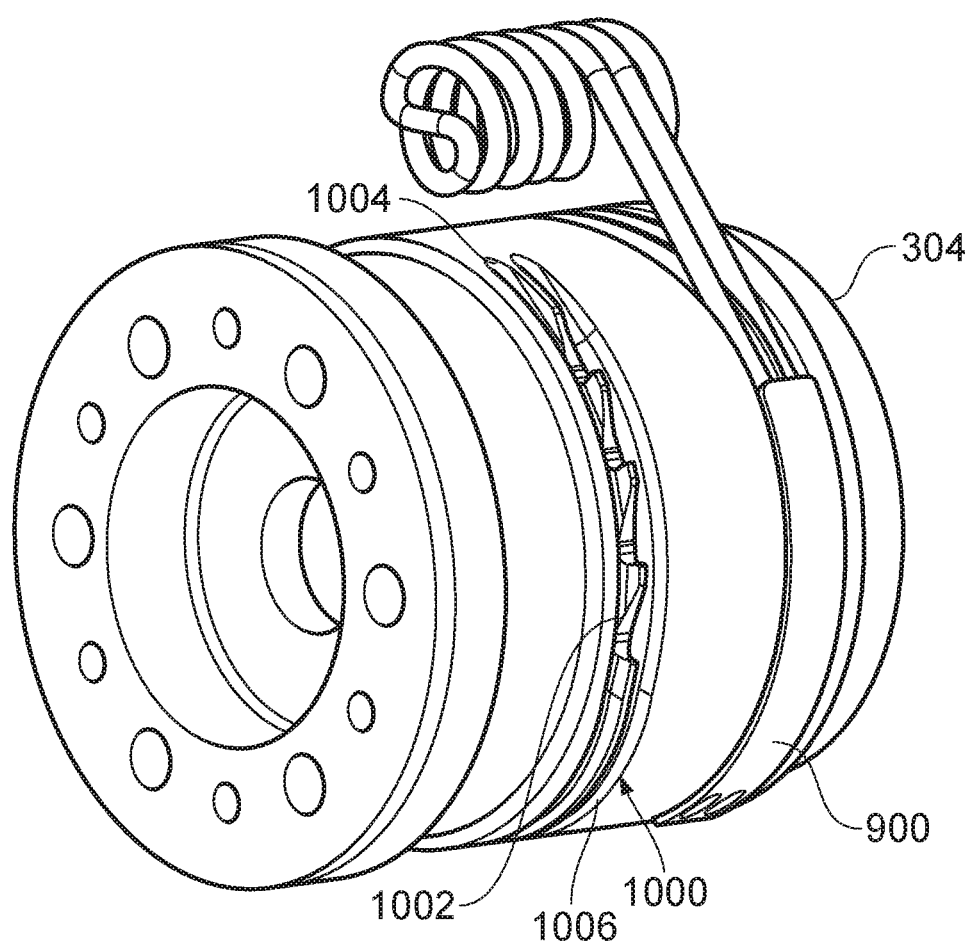
FIG. 13 shows a pulley and cable arrangement, with one cable and connector removed.

FIG. 13 shows the fourth pulley 304 with one of the connectors 900 removed, exposing a receiving portion 1000 for receiving the connector 900. The receiving portion 1000 has two helical grooves 1004, 1006 for receiving the first and second cable portions 912, 914 and receiving teeth 1002 for engaging with respective teeth of the connector 900.

Figure 14:
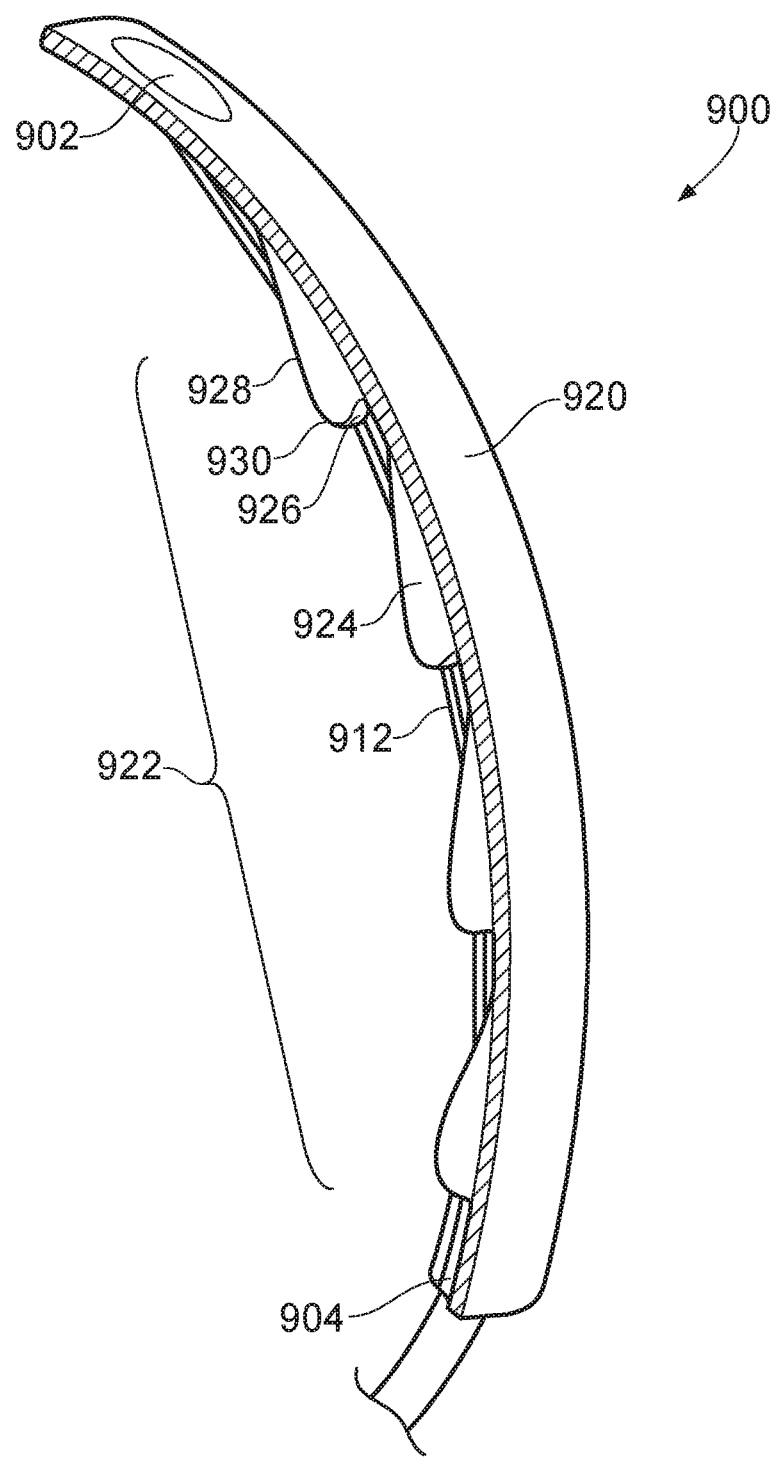
FIG. 14 shows a sectional view of a connector.

FIG. 14 shows a section view of a connector 900, with a portion removed. It can therefore be seen that the cable portion 912 extends along the length of the connector from a first fixation point 902. The connector 900 also comprises a body 920, which is a substantially flat, curved portion radially outside the cable portion 912, and which has a toothed portion 922 on a radially inner side, adjacent the cable portions 912.

The toothed portion 922 comprises teeth 924, each tooth having an engagement surface 926, facing a first direction away from the first fixation point 902 and substantially perpendicular to the body portion 920, and facing towards a second fixation point 904. Each tooth also has an angled surface 928, whose structure supports the engagement surface 926, and subtends an angle of between 20 and 60 degrees with the body portion 920 and a curved surface 930 joining the engagement surface 926 and the angled surface 928. Each tooth 924 may be solid and defined by the engagement surfaces 926, angled surface 928 and curved surface 930 and may extend away from the body portion 920.

Figure 15:
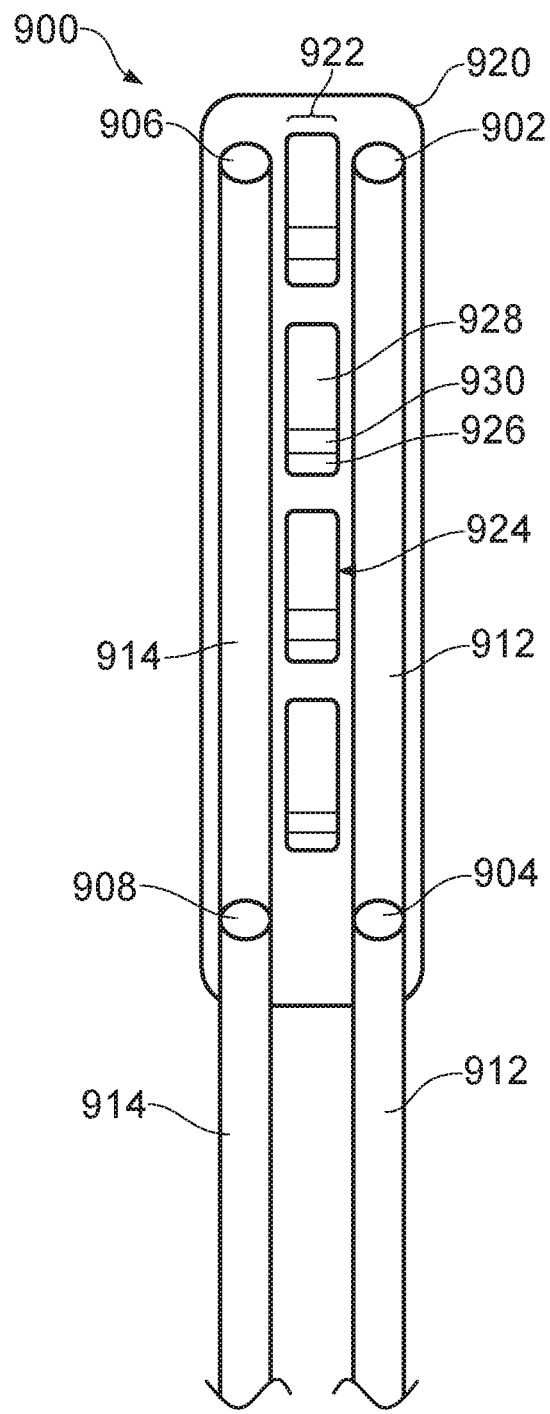
FIG. 15 shows a plan view of a connector.

FIG. 15 gives a plan view of the connector 900, showing two parallel cable portions 912, 914 and the toothed potion 922 lying between the cables. The second cable portion 914 is also fixed to the connector 900 at two fixation points 906, 908, and the toothed portion 922 lies between the fixation points 902, 904, 906, 908. By providing such a symmetrical arrangement, stresses on the connector may be more equally balanced and bending forces on the teeth may be reduced.

The connector 900 may be formed by a moulding process, optionally an injection moulding process, and may be moulded around the cable portions 912, 914. The cable portions 912, 914 may be placed in the mould and maintained in tension as plastic is introduced into the mould and the plastic may diffuse through the fibres of the cables. By moulding the connectors in this way, a more consistent tension may be formed along the cables. The connectors 900 may thereby be formed with a level of residual stress, which manifests as a tensile stress in each of the cable portions 912, 914 and a compressive stress in the body portion 920.

Portions of excess cable may extend out of the mould in both directions (i.e. in both directions from the fixation point 902, 906) and these cable portions may be used to secure the connector 900 to the second pulley 304 and subsequently removed. The excess cable portions (not shown) may extend away from the fixation points 902, 906 and may be held in tension in order to resiliently couple the connector 900 to a pulley 304.

A further disclosure is set out in the following clauses:

A. A connector for coupling a cable to a pulley, comprising:
    a toothed portion having a body and a plurality of teeth extending away from the body, the teeth each having an engagement surface facing a first direction, and
    a cable portion, extending along the toothed portion and fixed to the toothed portion at a first fixation point, the cable portion extending away from the first fixation point and along the toothed portion in the first direction.

B. The connector of clause A, wherein the cable portion is fixed to the toothed portion at a second fixation point, the plurality of teeth being located between the first and the second fixation points.

C. The connector of clause A or B, wherein the cable portion is a first cable portion and
    wherein the connector further comprises a second cable portion fixed to the toothed portion at a third fixation point, the cable portion extending away from the third fixation point and along the toothed portion in the first direction substantially parallel to the first cable portion.

D. The connector of clause C, wherein the second cable portion is fixed to the toothed portion at a fourth fixation point, the plurality of teeth being located between the third and the fourth fixation points.

E. The connector of clause C or D, wherein the plurality of teeth are located between the first and second cable portions.

F. The connector of any preceding clause, wherein the first and/or second cable portion terminates at the first and or third fixation point respectively.

G. The connector of any preceding clause, wherein the toothed portion is curved.

H. The connector of any preceding clause, wherein the toothed portion is less flexible than the cable portion.

I. The connector of any preceding clause, wherein each engagement face is substantially perpendicular to the body.

J. The connector of any preceding clause, wherein the engagement faces of the teeth each are normal to and lie along a circular arc.

K. The connector of any preceding clause, wherein the teeth are substantially triangular, each tooth having an angled face extending between the engagement face and the body.

L. The connector of clause K, wherein the angled faces meet the body at an angle of between 10° and 60°.

M. The connector of clause K or L, wherein the teeth each have a curved surface where the angled face meet the engagement face.

N. A pulley, having a cylindrical surface, the cylindrical surface having a receiving portion, the receiving portion having a toothed recessed arranged to receive the connector of any preceding clause.

O. The pulley of clause N, further comprising a helical groove arranged to receive the cable portion.

P. A pulley and cable system, comprising the pulley of clause N or O and the connector of any one of clauses A to M.

Q. A method of manufacturing a connector, the method comprising:
providing a mould for forming a connector portion;
inserting a cable portion through at least one wall of the mould; and
moulding a connector portion around the cable portion while the cable portion is held in tension in the mould, such that the connector portion is formed around the cable with a tensile residual stress in the cable.

R. The method of clause Q, wherein the cable portion extends through the connector portion, such that the cable portion extends away from the connector portion in two directions.

S. The method of clause Q or R, wherein the material used to form the connector portion diffuses through the fibres of the cable portion.

T. The method of clause Q, R or S, wherein the method forms a connector according to any one of clauses A to M.

U. A method of constructing the pulley and a cable system of clause P, comprising:
holding an excess cable portion extending from the first or third fixation point away from the connector portion,
moving the connector into engagement with the receiving portion while exerting tension on the excess cable portion; and
removing the excess cable portion after the connector is engaged with the receiving portion.

Although the invention has been described above with reference to one or more preferred embodiments, it will be appreciated that various changes or modifications may be made without departing from the scope of the invention as defined in the appended claims.

The invention claimed is:

1. An actuator comprising:
a motor having a motor housing and a drive shaft, the motor arranged to rotate the drive shaft relative to the motor housing about a drive shaft axis;
a first torque transfer device arranged to transfer torque from the drive shaft to a second shaft, the second shaft being rotatable about a second shaft axis parallel to and radially spaced from the drive shaft axis; and
an output torque transfer device arranged to transfer torque from the second shaft to the motor housing, wherein:
when the motor housing is maintained in a fixed position, rotation of the drive shaft relative to the motor housing causes rotation of the position of the second shaft axis about the motor housing, or
when the position of the second shaft axis is maintained in a fixed position, rotation of the drive shaft relative to the motor housing causes rotation of the motor housing about the position of the second shaft axis.

2. The actuator of claim 1, wherein:
when the motor housing is maintained in a fixed position, rotation of the drive shaft relative to the motor housing causes rotation of the position of the second shaft axis about the motor housing.

3. The actuator of claim 1, wherein:
when the position of the second shaft axis is maintained in a fixed position, rotation of the drive shaft relative to the motor housing causes rotation of the motor housing relative to about the position of the second shaft axis.

4. The actuator of claim 1, further comprising a second shaft mount, the second shaft mount being rotatably coupled to the motor housing, and arranged to support the second shaft.

5. The actuator of claim 1, wherein at least one of the first torque transfer device and the output torque transfer device comprises a pulley system.

6. The actuator of claim 1, wherein the first torque transfer device is arranged such that the torque provided to the second shaft is greater than the torque provided to the drive shaft.

7. The actuator of claim 1, wherein the output torque transfer device is arranged such that the torque provided to the motor housing by the output torque transfer device is greater than the torque provided to the second shaft.

8. The actuator of claim 1, further comprising an outer housing fixed to the motor housing, the outer housing enclosing at least one of the second shaft, the motor and the first torque transfer device and the output torque transfer device.

9. The actuator of claim 1, wherein a torque ratio of the first and final torque transfer devices is substantially the same.

10. The actuator of claim 1, wherein the second shaft and the motor housing have a relative rotational or orbital range of less than 180°.

11. The actuator of claim 1, wherein an output of the actuator is provided at a member arranged to rotate about the drive shaft axis.

12. The actuator of claim 1, wherein the second shaft overlaps the motor in a direction along the drive shaft axis.

13. The actuator of claim 1, wherein a component of the first torque transfer device fixed to the second shaft overlaps the motor housing in a radial direction.

14. The actuator of claim 1, wherein the output torque transfer device comprises a third shaft, a second torque transfer device arranged to transfer torque from the second shaft to the third shaft, and a third torque transfer device arranged to transfer torque from the third shaft to the motor housing.

15. The actuator of claim 1, further comprising a plurality of encoders, each encoder arranged to measure a rotational position of the drive shaft, second shaft or motor housing relative to another of the motor housing or the second shaft mount.

16. The actuator of claim 1, further comprising an electrical cable arranged to provide power to the motor from a location outside the actuator, the electrical cable extending at least partially around the drive shaft and/or the motor housing.

17. A robotic arm comprising a first member, a second member and a joint where the first and second members join, wherein an actuator according to claim 1 is situated at the joint and configured to actuate the joint to move the first member relative to the second member.

18. An actuator comprising:
a motor having a housing and a drive shaft, the motor arranged to rotate the drive shaft relative to the housing about a drive shaft axis;
a first torque transfer device arranged to transfer torque from the drive shaft to a second shaft, the second shaft being rotatable about a second shaft axis spaced from the drive shaft axis; and
an output torque transfer device arranged to transfer torque from the second shaft to an output member, the output member being arranged to rotate about an output axis;
wherein the output axis is coaxial with the drive shaft axis, and
wherein the output member is fixedly attached relative to the stator of the motor.

19. The actuator of claim 18, wherein the motor is arranged at least partially within the output member.

20. An actuator comprising:
a motor having a housing and a drive shaft, the motor arranged to rotate the drive shaft relative to the housing about a drive shaft axis;
a first torque transfer device arranged to transfer torque from the drive shaft to a second shaft, the second shaft being rotatable about a second shaft axis spaced from the drive shaft axis; and
an output torque transfer device arranged to transfer torque from the second shaft to an output member, the output member being arranged to rotate about an output axis;
wherein the motor is arranged at least partially within the output member, and
wherein:
(i) the output member is substantially annular,
(ii) the output member is a pulley, or
(iii) the stator of the motor is fixedly attached with respect to the output member.

21. The actuator of claim 20, wherein the output member is substantially annular.

22. The actuator of claim 20, wherein the output member is a pulley.

23. The actuator of claim 20, wherein the stator of the motor is fixedly attached with respect to the output member.

24. An actuator comprising:
a motor having a housing, a stator, a rotor, and a drive shaft, the motor arranged to rotate the drive shaft relative to the housing about a drive shaft axis;
a first torque transfer device arranged to transfer torque from the drive shaft to a second shaft, the second shaft being rotatable about a second shaft axis spaced from the drive shaft axis; and
an output torque transfer device arranged to transfer torque from the second shaft to an output member, the output member being arranged to rotate about an output axis;
wherein the output member is fixedly attached relative to the stator of the motor.

* * * * *